(12) United States Patent
Tsuei et al.

(10) Patent No.: US 10,209,572 B2
(45) Date of Patent: Feb. 19, 2019

(54) LIQUID CRYSTAL DISPLAY

(71) Applicant: Innolux Corporation, Miao-Li County (TW)

(72) Inventors: Bo-Chin Tsuei, Miao-Li County (TW); Jian-Cheng Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 116 days.

(21) Appl. No.: 15/224,768

(22) Filed: Aug. 1, 2016

(65) Prior Publication Data

US 2017/0059949 A1 Mar. 2, 2017

(30) Foreign Application Priority Data

Aug. 26, 2015 (CN) .......................... 2015 1 0530333

(51) Int. Cl.
*G02F 1/1337* (2006.01)
*G02F 1/1333* (2006.01)

(52) U.S. Cl.
CPC .. *G02F 1/133753* (2013.01); *G02F 1/133707* (2013.01); *G02F 1/133788* (2013.01); *G02F 2001/133757* (2013.01)

(58) Field of Classification Search
CPC ............. G02F 1/134309; G02F 1/1337; G02F 1/134336; G02F 2201/122; G02F 1/133707; G02F 2001/134345
See application file for complete search history.

(56) References Cited

U.S. PATENT DOCUMENTS

| 2009/0230396 A1* | 9/2009 | Na | G02F 1/133707 257/59 |
| 2012/0133872 A1* | 5/2012 | Kim | G02F 1/133707 349/128 |
| 2015/0268517 A1* | 9/2015 | Song | G02F 1/134309 349/43 |

* cited by examiner

*Primary Examiner* — Nathanael R Briggs
(74) *Attorney, Agent, or Firm* — McClure, Qualey & Rodack, LLP (57) ABSTRACT

A liquid crystal (LCD) panel is provided. The LCD panel has a plurality of pixels. One of the pixels includes a first substrate, a second substrate and a liquid crystal layer. The first substrate includes a first electrode layer and a first alignment layer covering the first electrode layer. The second substrate includes a second electrode layer and a second alignment layer covering the second electrode layer. The second electrode layer has a first electrode pattern and a second electrode pattern. The first electrode pattern and the second electrode pattern are separated. The first electrode pattern has a convex edge. The second electrode pattern has a concave edge. The shape of the convex edge is complementary to the shape of the concave edge. The liquid crystal layer is disposed between the first substrate and the second substrate.

8 Claims, 10 Drawing Sheets

LIQUID CRYSTAL DISPLAY

This application claims the benefit of People's Republic of China application Serial No. 201510530333.X, filed Aug. 26, 2015, the subject matter of which is incorporated herein by reference.

BACKGROUND

Technical Field

The disclosure relates in general to a display panel, and more particularly to a liquid crystal display panel applied the photo alignment technology.

Description of the Related Art

Liquid crystal display (LCD) penal has advantages of light weight, thin and long life, such that the LCD panel is widely used in display technology. In a LCD panel, a plurality of pixels form a frame. The quality of the frame image is related to the transmittance of each of the pixels. The researchers tried to improve the transmittance of each of the pixels to provide a high quality LCD panel.

SUMMARY

The disclosure is directed to a pixel electrode design of a liquid crystal display (LCD) panel. The pixel electrode and the common electrode are modified to improve the transmittance of the LCD panel.

According to one embodiment, a liquid crystal display (LCD) panel is provided. The LCD panel has a plurality of pixels. The LCD panel includes a first substrate, a second substrate and a liquid crystal layer. The first substrate includes a first electrode layer and a first alignment layer. The first alignment layer covers the first electrode layer. The second substrate includes a second electrode layer and a second alignment layer. The second electrode layer has a first electrode pattern and a second electrode pattern in one of the pixels. The first electrode pattern and the second electrode pattern are separated. The first electrode pattern has a convex edge. The second electrode pattern has a concave edge. The shape of the convex edge is complementary to the shape of the concave edge. The first electrode pattern has a first region, a second region, a third region and a fourth region which are arranged in four quadrants sequentially. The second pattern has a fifth region, a sixth region, a seventh region and an eighth region which are arranged in four quadrants sequentially. The third region is adjacent to the sixth region. The fourth region is adjacent to the fifth region. The second electrode layer further has a plurality of branch electrodes separately disposed in the first region to the eighth region. The branch electrodes disposed in the third region and the sixth region are arranged along the same direction. The branch electrodes disposed in the fourth region and the fifth region are arranged along the same direction. The branch electrodes disposed in the third region and the fourth region are arranged along different directions. The second alignment layer covers the second electrode layer. The liquid crystal layer is disposed between the first substrate and the second substrate.

According to another embodiment, a liquid crystal display (LCD) panel is provided. The LCD panel has a plurality of pixels. The LCD panel includes a first substrate, a second substrate and a liquid crystal layer. The first substrate includes a first electrode layer and a first alignment layer. The first alignment layer covers the first electrode layer. The second substrate includes a second electrode layer and a second alignment layer. In one of the pixels, the second electrode layer has a first region, a second region, a third region and a fourth region which are arranged in four quadrants sequentially. The second electrode layer further has a first trunk electrode, a second trunk electrode, a third trunk electrode and a fourth trunk electrode, which define the first region to the fourth region, in the one of the pixels. The first trunk electrode and the second trunk electrode are extended along a direction parallel to a first straight line. A central axis of the first trunk electrode and a central axis of the second trunk electrode are located at two opposite sides of the first straight line respectively. The third trunk electrode and the fourth trunk electrode are extended along a direction parallel to a second straight line. A central axis of the third trunk electrode and a central axis of the fourth trunk electrode are located at two opposite sides of the second straight line respectively. The first straight line and the second straight line are intersected with each other. The second alignment layer covers the second electrode layer. The liquid crystal layer is disposed between the first substrate and the second substrate.

According to another embodiment, a liquid crystal display (LCD) panel is provided. The LCD panel has a plurality of pixels. The LCD panel includes a first substrate, a second substrate and a liquid crystal layer. The first substrate includes a first electrode layer and a first alignment layer. The first alignment covers the first electrode layer. The second substrate includes a second electrode layer and a second alignment layer. In one of the pixels, the second electrode layer has a first region, a second region, a third region and a fourth region which are arranged in four quadrants sequentially. The second electrode layer further has a plurality of branch electrodes separately disposed in the first region to the fourth region. The branch electrodes disposed in the first region and the third region are arranged along a first direction. The branch electrodes in the second region and the fourth region are arranged along a second direction different from the first direction. One of the branch electrodes in the first region is connected to and perpendicular to another two of the branch electrodes in the second or fourth region to form a saw tooth shaped structure. The second alignment layer covers the second electrode layer. The liquid crystal layer is disposed between the first substrate and the second substrate.

The above and other aspects of the disclosure will become better understood with regard to the following detailed description of the non-limiting embodiment(s). The following description is made with reference to the accompanying drawings.

DETAILED DESCRIPTION

Figure 1:
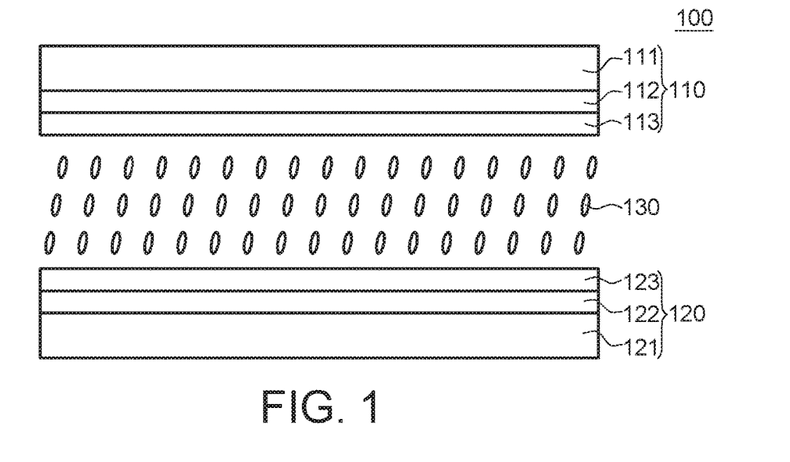
FIG. 1 shows a liquid crystal display (LCD) panel.

Please refer to FIG. 1, which shows a liquid crystal display (LCD) panel 100. The LCD panel 100 includes a first substrate 110, a second substrate 120 and a liquid crystal layer 130. For example, in the following embodiments, the first substrate 110 is, but not limited to, a color filter substrate; and the second substrate 120 is, but not limited to, a thin film is transistor substrate. The liquid crystal layer 130 is disposed between the first substrate 110 and the second substrate 120. The first substrate 110 includes a first base layer 111, a first electrode layer 112 and a first alignment layer 113. The first electrode layer 112 disposes on the first base layer 111. The first alignment layer 113 covers the first electrode layer 112. The second substrate 120 includes a second base layer 121, a second electrode layer 122 and a second alignment layer 123. For example, in the following embodiments, the first electrode layer 112 is, but not limited to, a common electrode; and the second electrode layer 122 is, but not limited to, a pixel electrode. The second electrode layer 122 disposes on the second base layer 121. The second alignment layer 123 covers second electrode layer 122. The LCD panel 100 may be applied the Photo-Alignment Vertical Alignment (PAVA) technology.

Figure 2:
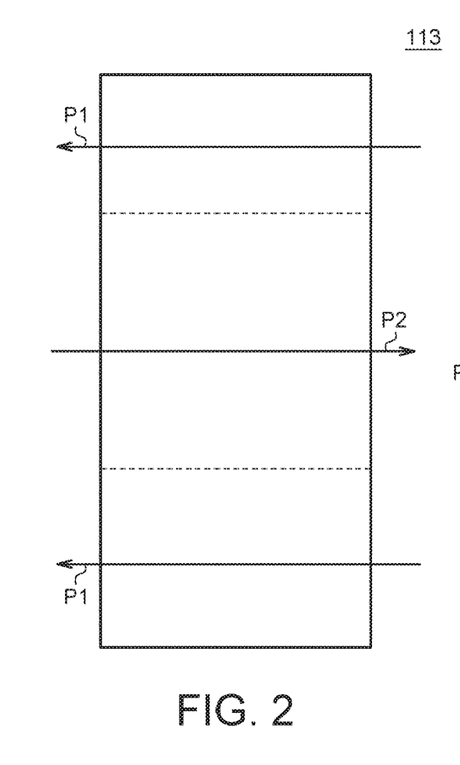
FIG. 2 illustrates a photo alignment of the first alignment layer in one pixel.
Figure 3:
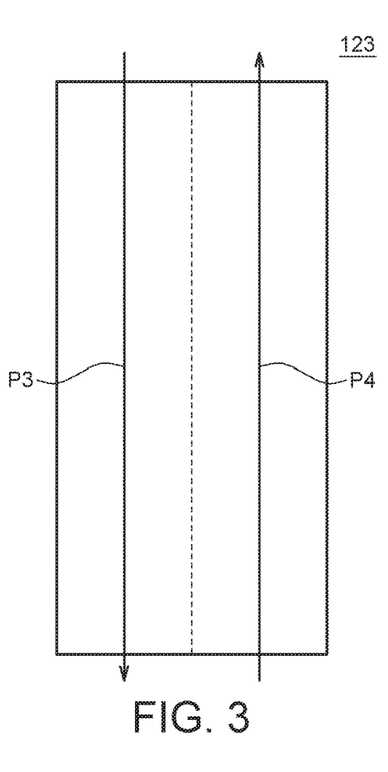
FIG. 3 illustrates a photo alignment of the second alignment layer in one pixel.

Please refer to FIGS. 2 and 3. FIG. 2 illustrates a photo alignment direction of the first alignment layer 113 in one pixel. FIG. 3 illustrates a photo alignment direction of the second alignment layer 123 in one pixel. The liquid crystal layer 130 is tilted according to varied liquid crystal tilted directions formed by the first alignment layer 113 and the second alignment layer 123 and the liquid crystal layer 130 will have a tilted direction of the resultant force. The first alignment layer 113 has a first alignment direction P1 and a second alignment direction P2. The upper portion and the lower portion of the first alignment layer 113 have the first alignment direction P1, and the central portion of the first alignment layer 113 has the second alignment direction P2. The first alignment direction P1 and the second alignment direction P2 are reverse.

The second alignment layer 123 has a third alignment direction P3 and a fourth alignment direction P4. The third alignment direction P3 and the fourth alignment direction P4 are reverse. The third alignment direction P3 and the fourth alignment direction P4 are perpendicular to the first alignment direction P1 and the second alignment direction P2.

Figure 4:
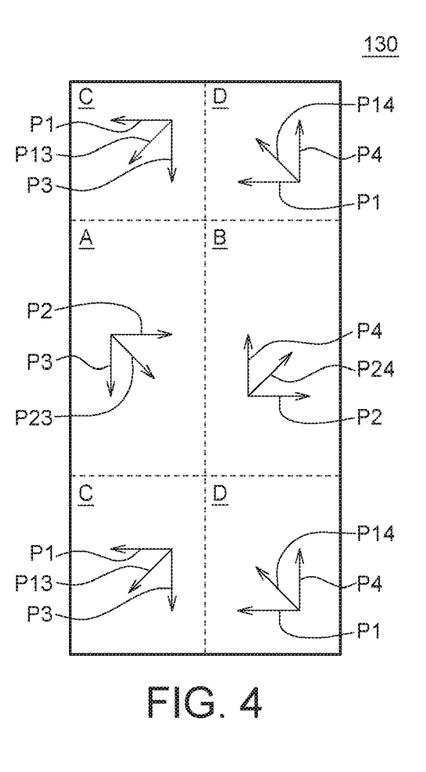
FIG. 4 illustrates a plurality of liquid crystal tilted directions of a liquid crystal layer in one pixel.

Please refer to FIG. 4, which illustrates a plurality of tilted direction of the resultant force P13, P14, P23, P24 of the liquid crystal layer 130 in one pixel. The liquid crystal layer 130 is disposed between the first alignment layer 113 and the second alignment layer 123. The liquid crystal molecules contacting the first alignment layer 113 is arranged along the first alignment direction P1 or the second alignment direction P2. The liquid crystal molecules contacting the second alignment layer 123 is arranged along the third alignment direction P3 or the fourth alignment direction P4. The liquid crystal molecules disposed between the first alignment layer 113 and the second alignment layer 123 is affected by two alignment directions from first alignment layer 113 and the second alignment layer 123. As shown in FIG. 4, the liquid crystal molecules in a region A are arranged along a first tilted direction P23 of the resultant force formed by the second alignment direction P2 and the third alignment direction P3. The liquid crystal molecules in a region B are arranged along a second tilted direction P24 of the resultant force formed by the second alignment direction P2 and the fourth alignment direction P4. The liquid crystal molecules in a region C are arranged along a third tilted direction P13 of the resultant force formed by the first alignment direction P1 and the third alignment direction P3. The liquid crystal molecules in a region D are arranged along a fourth tilted direction P14 of the resultant force formed by the first alignment direction P1 and the fourth alignment direction P4. The first tilted direction P23 is perpendicular to the second tilted direction P24. The second tilted direction P24 is perpendicular to the fourth tilted direction P14. The fourth tilted direction P14 is perpendicular to the third tilted direction P13. The third tilted direction P13 and the second tilted direction P24 are reverse, and the fourth tilted direction P14 and the first liquid tilted direction P23 are reverse.

Figures 5, 6:
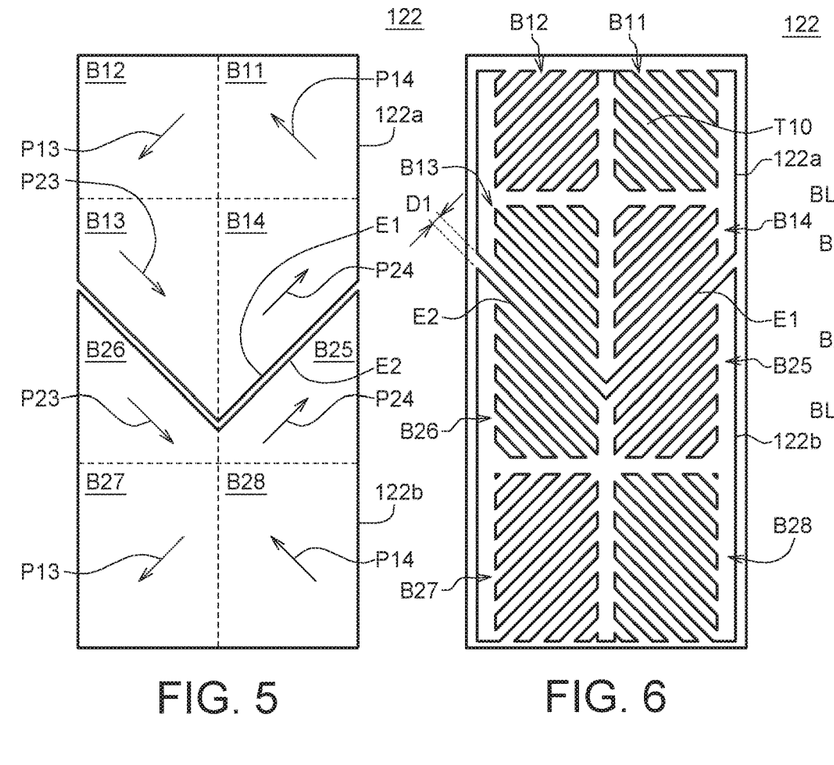
FIG. 5 shows a first region, a second region, a third region, a fourth region, a fifth region, a sixth region, a seventh region and an eighth region formed according to a first liquid crystal tilted direction, a second liquid crystal tilted direction, a third liquid crystal tilted direction and a fourth liquid crystal tilted direction in one pixel.
FIG. 6 shows a plurality of branch electrodes of a second electrode layer in one pixel.

Please refer to FIGS. 5 and 6. FIG. 5 shows a first region B11, a second region B12, a third region B13, a fourth region B14, a fifth region B25, a sixth region B26, a seventh region B27 and an eighth region B28 formed according to the first tilted direction P23, the second tilted direction P24, the third tilted direction P13 and the fourth tilted direction P14 in one pixel. FIG. 6 shows a plurality of branch electrodes T10 of the second electrode layer 122 in one pixel. In the present embodiment, one pixel is divided into two big areas which are bright area and dark area respectively to improve the color shift under different viewing angles. According to the two big areas, the second electrode layer 122 has a first electrode pattern 122a and a second electrode pattern 122b. The first electrode pattern 122a and the second electrode pattern 122b are separately disposed. The first electrode pattern 122a has a convex edge E1, and the second electrode pattern 122b has a concave edge E2. The convex edge E1 and the concave edge E2 are adjacent and have complementary shapes. The convex edge E1 and the concave edge E2 both are V shaped structures.

The first electrode pattern 122a has the first region B11, the second region B12, the third region B13 and the fourth region B14 which are arranged in four quadrants sequentially. The second electrode pattern 122b has the fifth region B25, the sixth region B26, the seventh region B27 and the eighth region B28 which are arranged in four quadrants sequentially. The third region B13 is adjacent to the sixth region B26. The fourth region B14 is adjacent to the fifth region B25. The first region B11 and the eighth region B28 are corresponding to the fourth tilted direction P14. The second region B12 and the seventh region B27 are corresponding to the third tilted direction P13. The third region B13 and the sixth region B26 are corresponding to the first tilted direction P23. The fourth region B14 and the fifth region B25 are corresponding to the second tilted direction P24 is formed in the.

As shown in FIG. 6, the second electrode layer 122 has the branch electrodes T10 disposed separately in the first region B11 to the eighth region B28. The branch electrodes T10 disposed in the first region B11 and the eighth region B28 are arranged along the same direction. The branch electrodes T10 disposed in the second region B12 and the seventh region B27 are arranged along the same direction. The branch electrodes T10 disposed in the third region B13 and the sixth region B26 are arranged along the same direction. The branch electrodes T10 disposed in the fourth region B14 and the fifth region B25 are arranged along the same direction. The branch electrodes T10 disposed in the first region B11, the second region B12, the third region B13 and the fourth region B14 are arranged like a diamond shaped structure. The branch electrodes T10 disposed in the fifth region B25, the sixth region B26, the seventh region B27 and the eighth region B28 are arranged like an X shaped structure.

Figure 7:
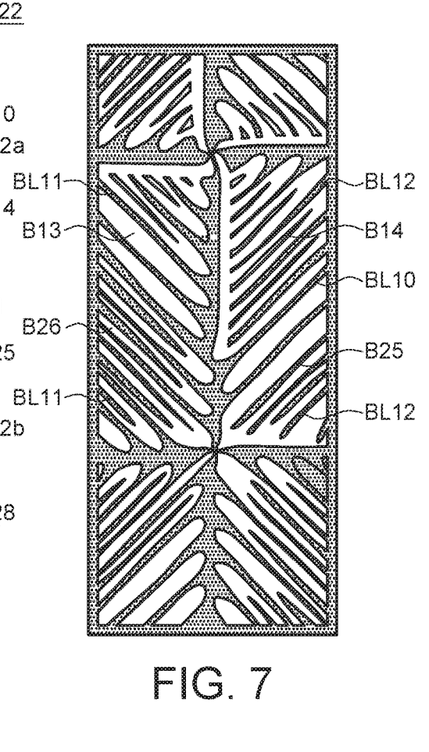
FIG. 7 shows a plurality of bright stripes and a plurality of dark stripes formed by the second electrode layer in one pixel.

Please refer to FIGS. 5 and 7. FIG. 7 shows a plurality of bright stripes and a plurality of dark stripes formed by the second electrode layer 122 in one pixel. When the light is turned on to pass through the pixel, some portion may form the dark stripe due to the optical rotation and the electrical field. In the third region B13 and the sixth region B26, because the liquid crystal molecules are tilted according to the first tilted direction P23, a plurality of dark stripes BL11 are formed. In the fourth region B14 and the fifth region B25, because the liquid crystal molecules are tilted according to the second tilted direction P24, a plurality of dark stripes BL12 are formed.

In the present embodiment, a dark stripe BL10 is formed between the convex edge E1 and the concave edge E2. Because the convex edge E1 and the concave edge E2 are extended along the first tilted direction P23 and the second tilted direction P24, the dark stripe BL10 will overlap some the dark stripes BL11, BL12. Therefore, the aperture ratio of the pixel can be increased. According to some experiments, the aperture ratio of the pixel can be increased 10.7%.

As shown in FIGS. 5 and 6, a distance D1 between the convex edge E1 and the concave edge E2 is 2 to 5 µm, such as 3.5 µm. The first tilted direction P23 is perpendicular to the second tilted direction P24, so the convex edge E1 or the concave edge E2 has a right angle.

Figure 8:
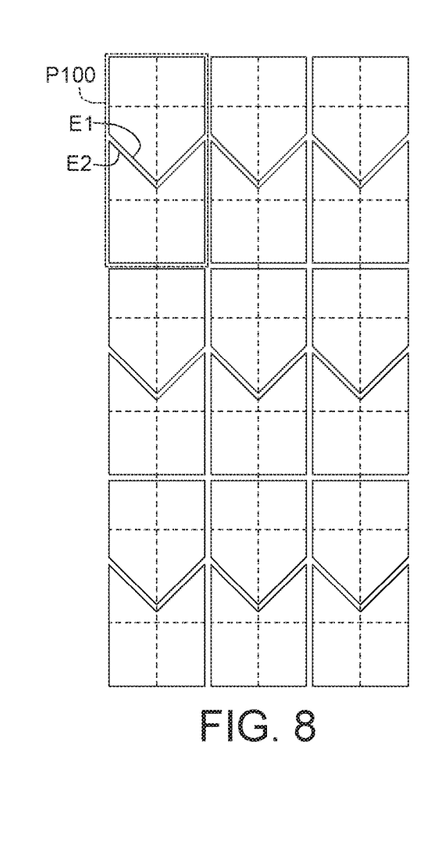
FIG. 8 shows a plurality of pixels according to one embodiment.
Figure 9:
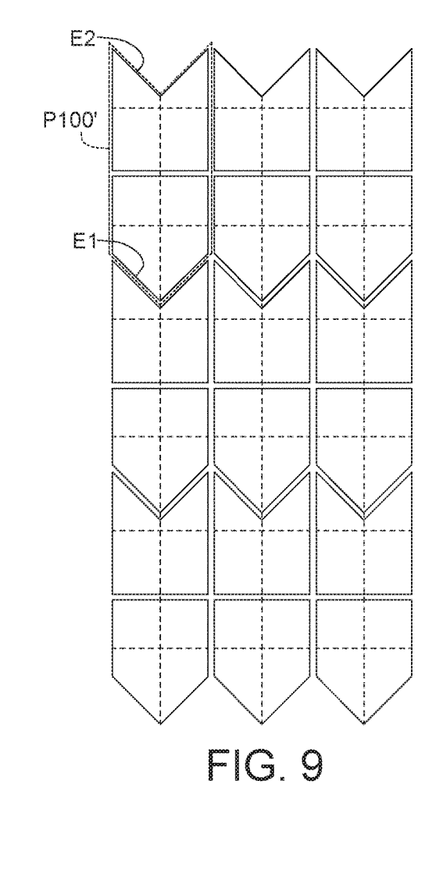
FIG. 9 shows a plurality of pixels according to one embodiment.

Please refer to FIG. 8, which shows a plurality of pixels P100 according to one embodiment. In one embodiment, each of the pixels P100 which is implemented the above design can be a rectangle shaped structure. The convex edge E1 and the concave edge E2 are located at the inside of each of the pixels P100. Refer to FIG. 9, which shows a plurality of pixels P100' according to another embodiment. In one embodiment, each of the pixels P100' can be a shield shaped structure. The convex edge E1 is located at the edge of one pixel P100' and adjacent to the concave edge E2 of another one pixel P100'. The concave edge E2 is located at the edge of one pixel P100' and adjacent to the convex edge E1 of another one pixel P100'.

Figure 10:
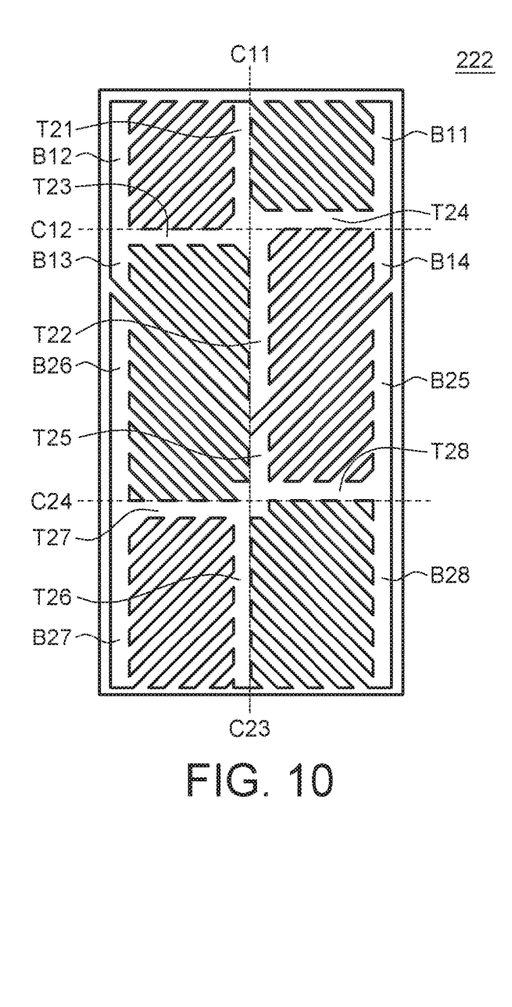
FIG. 10 shows a second electrode layer in one pixel according to another embodiment.

Please refer to FIG. 10, which shows a second electrode layer 222 in one pixel according to another embodiment. The second electrode layer 222 has a first trunk electrode T21, a second trunk electrode T22, a third trunk electrode T23 and a fourth trunk electrode T24 which define the first region B11, the second region B12, the third region B13 and the fourth region B14. The first trunk electrode T21 and the second trunk electrode T22 are extended along a direction parallel to a first straight line C11. A central axis of the first trunk electrode T21 and a central axis of the second trunk electrode T22 are located at two opposite sides of the first straight line C11 respectively. The third trunk electrode T23 and the fourth trunk electrode T24 are extended along a direction parallel to a second straight line C12. A central axis of the third trunk electrode T23 and a central axis of the fourth trunk electrode T24 are located at two opposite sides of the second straight line C12 respectively. The first straight line C11 and the second straight line C12 are crossed. In one embodiment, the first straight line C11 is substantially perpendicular to the second straight line C12.

Moreover, the second electrode layer 222 has a fifth trunk electrode T25, a sixth trunk electrode T26, a seventh trunk electrode T27 and an eighth trunk electrode T28 which define the fifth region B25, the sixth region B26, the seventh region B27 and the eighth region B28. The fifth trunk electrode T25 and the sixth trunk electrode T26 are extended along a direction parallel to a third straight line C23. A central axis of the fifth trunk electrode T25 and a central axis of the sixth trunk electrode T26 are located at two opposite sides of the third straight line C23 respectively. The seventh trunk electrode T27 and the eighth trunk electrode T28 are extended along a direction parallel to a fourth straight line C24. A central axis of the seventh trunk electrode T27 and a central axis of the eighth trunk electrode T28 are located at two opposite sides of the fourth straight line C24 respectively. The third straight line C23 and the fourth straight line C24 are crossed. In one embodiment, the third straight line C23 is substantially perpendicular to the fourth straight line C24.

As shown in FIGS. 2 and 10, the first trunk electrode 121 is diverged from the first straight line C11 according to the first alignment direction P1. The second trunk electrode T22 is diverged from the first straight line C11 according to the second alignment direction P2. That is to say, the first trunk electrode T21 and the second trunk electrode T22 are diverged from the first straight line C11 according to different directions.

As shown in FIGS. 3 and 10, the third trunk electrode T23 is diverged from the second straight line C12 according to the first alignment direction P3. The fourth trunk electrode T24 is diverged from the second straight line C12 according to the fourth alignment direction P4. That is to say, the third trunk electrode T23 and the fourth trunk electrode T24 are diverged from the second straight line C12 according to different directions. As such, the first trunk electrode T21, the second trunk electrode T22, the third trunk electrode T23 and the fourth trunk electrode T24 form a windmill shaped structure.

As shown in FIGS. 2 and 10, the fifth trunk electrode T25 is diverged from the third straight line C23 according to the second alignment direction P2. The sixth trunk electrode T26 is diverged from the third straight line C23 according to the first alignment direction P1. That is to say, the fifth trunk electrode T25 and the sixth trunk electrode T26 are diverged from the third straight line C23 according to different directions.

As shown in FIGS. 3 and 10, the seventh trunk electrode T27 is diverged from the fourth straight line C24 according to the third alignment direction P3. The eighth trunk electrode T28 is diverged from the fourth straight line C24 according to the fourth alignment direction P4. That is to say, the seventh trunk electrode T27 and the eighth trunk electrode T28 are diverged from the fourth straight line C24 according to different directions. As such, the fifth trunk electrode T25, the sixth trunk electrode T26, the seventh trunk electrode T27 and the eighth trunk electrode T28 form a windmill shaped structure.

Each of the central axis of the first trunk electrode T21 and the central axis of the second trunk electrode T22 is diverged from the first straight line C11 by 0.1 to 8 μm. Each of the central axis of the third trunk electrode T23 and the central axis of the fourth trunk electrode T24 is diverged from the second straight line C12 by 0.1 to 8 μm. Each of the central axis of the fourth trunk electrode T24 and the central axis of the fifth trunk electrode T25 is diverged from the third straight line C23 by 0.1 to 8 μm. Each of the central axis of the seventh trunk electrode T27 and the central axis of the eighth trunk electrode T28 is diverged from the fourth straight line C24 by 0.1 to 8 μm.

Figure 11:
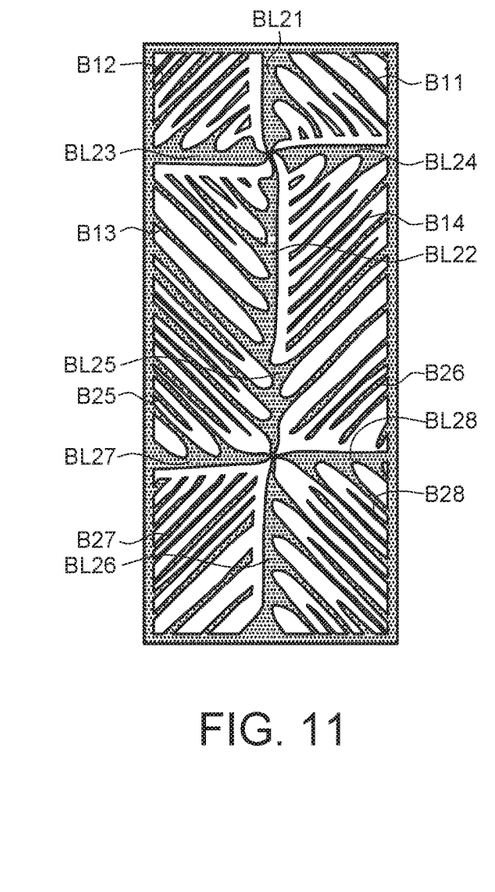
FIG. 11 shows a plurality of bright stripes and a plurality of dark stripes formed by the second electrode layer of FIG. 10 in one pixel.

Please refer to FIGS. 10 and 11. FIG. 11 shows a plurality of bright stripes and a plurality of dark stripes formed by the second electrode layer 222 of FIG. 10 in one pixel. A plurality of dark stripes BL21, BL22, BL23, BL24, BL25, BL26, BL27, BL28 are formed by the first trunk electrode T21, the second trunk electrode T22, the third trunk electrode T23, the fourth trunk electrode T24, the fifth trunk electrode T25, the sixth trunk electrode T26, the seventh trunk electrode T27 and the eighth trunk electrode T28.

The pixel electrode is disposed at the central portion of the pixel. The dark stripes BL21, BL22, BL23, BL24, BL25, BL26, BL27, BL28 located at the central portion of the pixel will overlap with the dark stripe formed by the pixel electrode, such that the aperture ratio of the pixel can be increased. According to some experiments, the aperture ratio of the pixel can be increased 12.2%.

Figure 12:
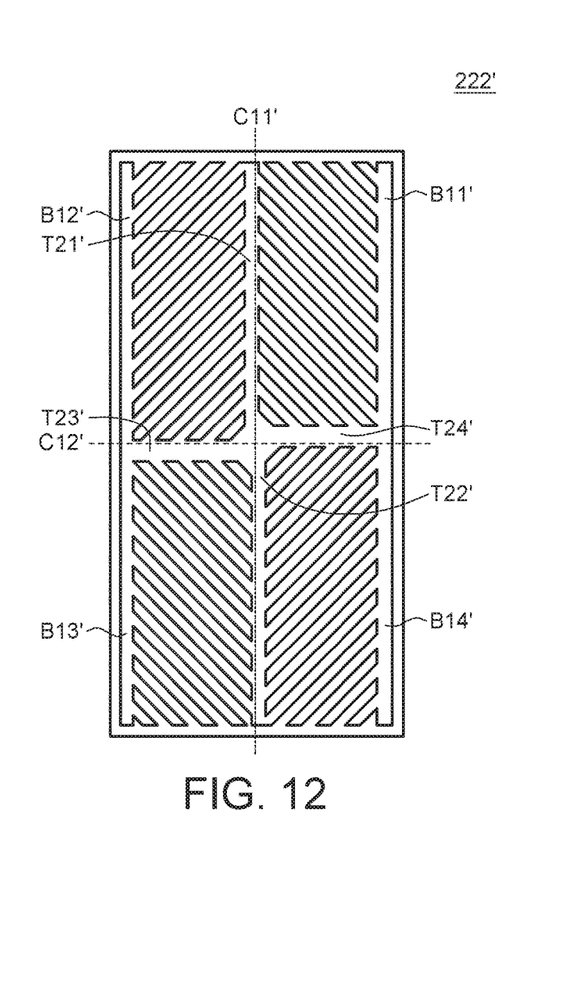
FIG. 12 shows a second electrode layer in one pixel according to another embodiment.

Please refer to FIG. 12, which shows a second electrode layer 222' in one pixel according to another embodiment. In one embodiment, the second electrode layer 222' only has a first region B11', a second region B12', a third region B13' and a fourth region B14'. The second electrode layer 222' has a first trunk electrode T21', a second trunk electrode T22', a third trunk electrode T23' and a fourth trunk electrode T24' which form the first region B11', the second region B12', the third region B13' and the fourth region B14'. The first trunk electrode T21' and the second trunk electrode T22' are extended a direction parallel to a first straight line C11'. A central axis of the first trunk electrode T21' and a central axis of the second trunk electrode T22' are located at two opposite sides of the first straight line C11'. The third trunk electrode T23' and the fourth trunk electrode T24' are extended along a direction parallel to a second straight line C12'. A central axis of the third trunk electrode T23' and a central axis of the fourth trunk electrode T24' are located at two opposite sides of the second straight line C12'. The second electrode layer 222' further has a plurality of branch electrodes arranged like a diamond shaped structure.

Figure 13:
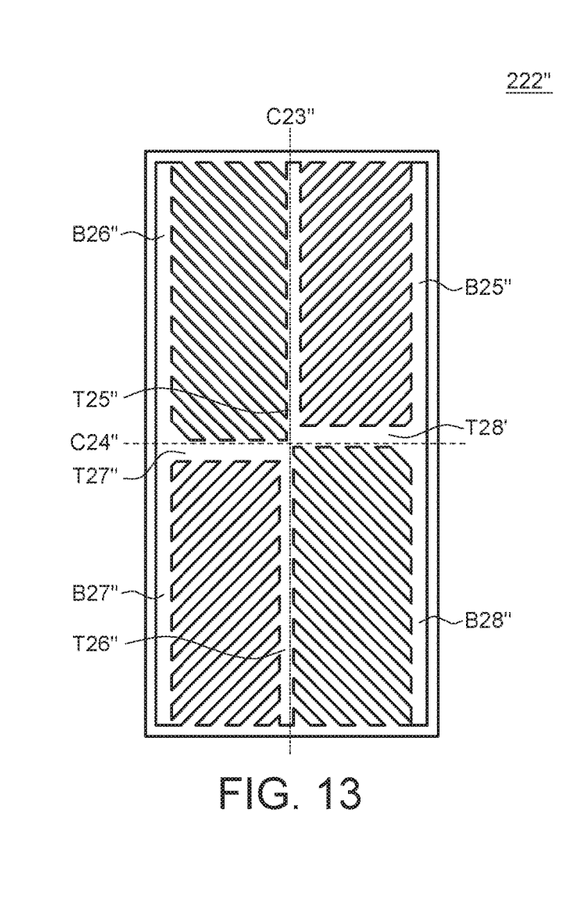
FIG. 13 shows a second electrode layer in one pixel according to another embodiment.

Please refer to FIG. 13, which shows a second electrode layer 222" in one pixel according to another embodiment. In one embodiment, the second electrode layer 222" only has a fifth region B25", a sixth region B26", a seventh region B27" and an eighth region B28". The second electrode layer 222" has a fifth trunk electrode T25", a sixth trunk electrode T26", a seventh trunk electrode T27" and an eighth trunk electrode T28" which form the fifth region B25", the sixth region B26", the seventh region B27" and the eighth region B28". The fifth trunk electrode T25" and the sixth trunk electrode T26" are extended along a direction parallel to a third straight line C23". A central axis of the fifth trunk electrode T25" and a central axis of the sixth trunk electrode T26" are located at two sides of the third straight line C23" respectively. The seventh trunk electrode T27" and the eighth trunk electrode T28" are extended along a direction parallel to a fourth straight line C24". A central axis of the seventh trunk electrode T27" and a central axis of the eighth trunk electrode T28" are located at two sides of the fourth straight line C24" respectively.

Figure 14:
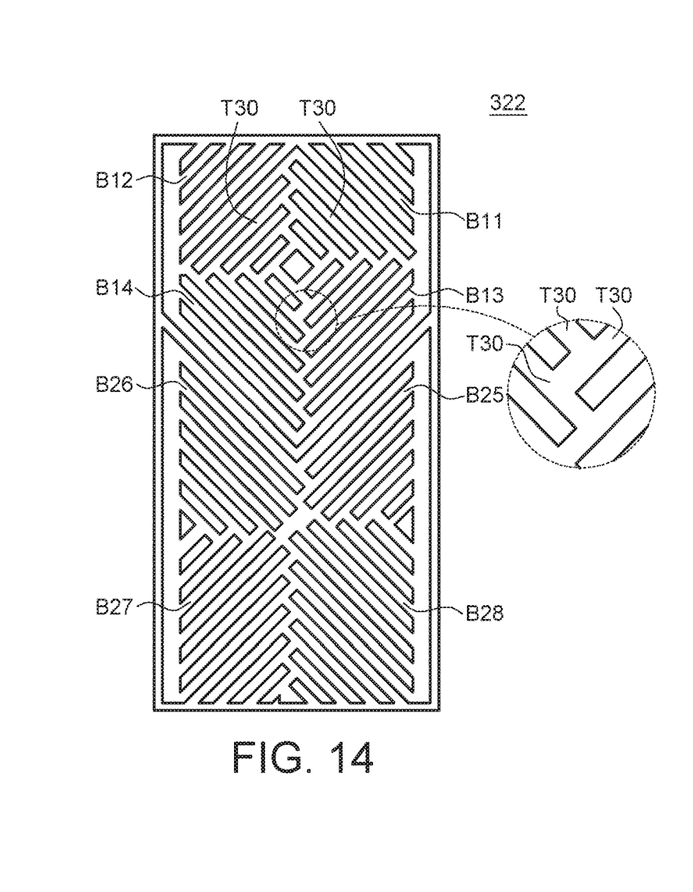
FIG. 14 shows a second electrode layer in one pixel according to another embodiment.

Please refer to FIG. 14, which shows a second electrode layer 322 in one pixel according to another embodiment. In this embodiment, one of a plurality of branch electrodes T30 in one of the regions (B11, B12, B13, or B14) is connected to and perpendicular to another two of the branch electrodes T30 in another region adjacent to the one of the regions to form a saw tooth shaped structure.

Figure 15:
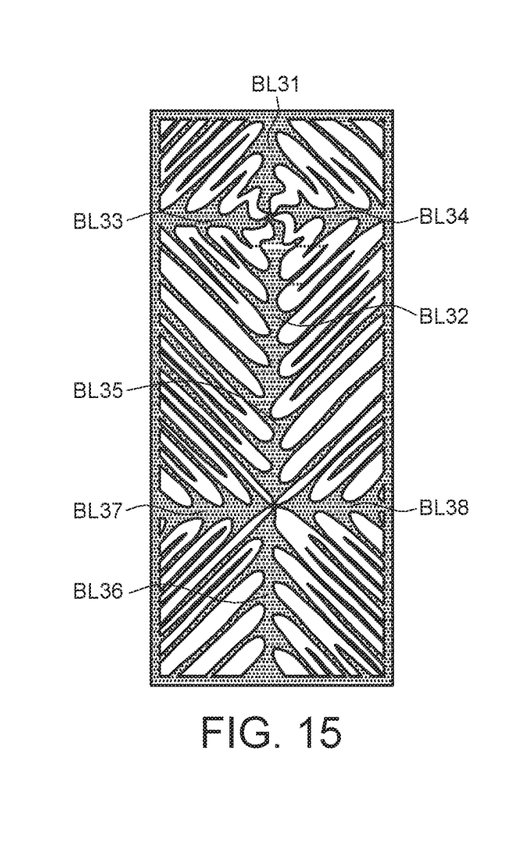
FIG. 15 shows a plurality of bright stripes and a plurality of dark stripes formed by the second electrode layer of FIG. 14 in one pixel.

Please refer to FIGS. 14 and 15. FIG. 15 shows a plurality of bright stripes and a plurality of dark stripes formed by the second electrode layer 322 of FIG. 14 in one pixel. If one branch electrode is connected to one trunk electrode which is a straight line shaped structure, there will form a 0/90 electric field (horizontal electric field and vertical electric field). In this embodiment, the branch electrodes T30 of the second electrode layer 322 are connected to form a saw tooth shaped structure serves as a trunk electrode, such that a 45/135 electric field is formed. As such, dark stripes (not shown) formed by the branch electrodes T30 can be reduced and can be accurately overlapped with the dark stripes BL31 to BL38 formed by the photo alignment process. According to some experiments, the aperture ratio of the pixel can be increased 12.8%.

Figure 16:
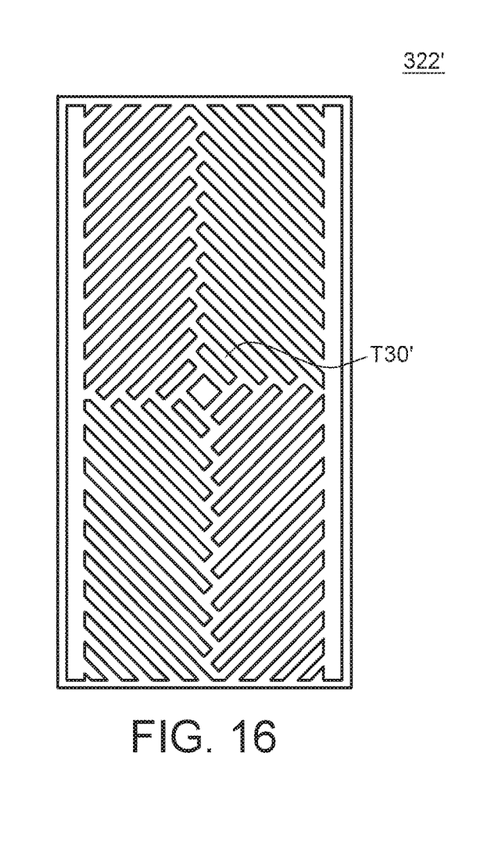
FIG. 16 shows a second electrode layer in one pixel according to another embodiment.

Please refer to FIG. 16, which shows a second electrode layer 322' in one pixel according to another embodiment. In this embodiment, the branch electrodes T30' of the second electrode layer 322 are arranged in a diamond shaped structure. One of the branch electrodes T30' is connected to and perpendicular to another two of the branch electrodes T30' to form a saw tooth shaped structure.

Figure 17:
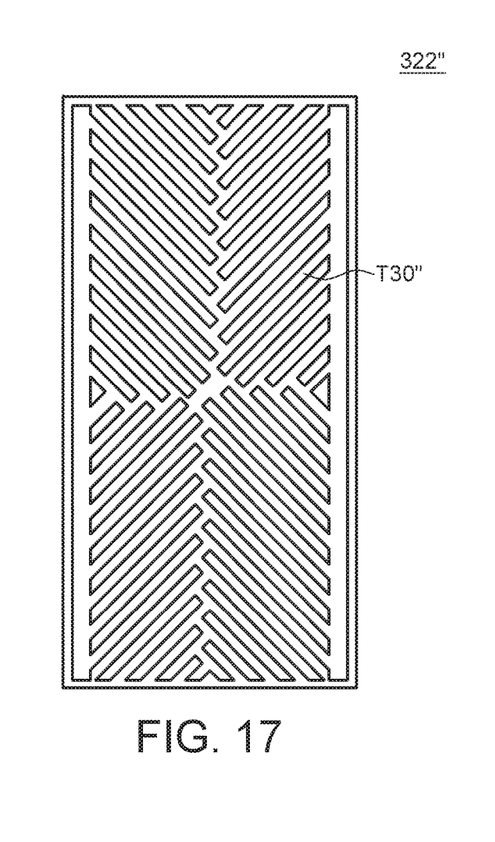
FIG. 17 shows a second electrode layer in one pixel according to another embodiment.

Please refer to FIG. 17, which shows a second electrode layer 322" in one pixel according to another embodiment. In this embodiment, the branch electrodes T30" of the second electrode layer 322" are arranged in an X shaped structure. One of the branch electrodes T30" is connected to and perpendicular to another one of the branch electrodes T30" to form a saw tooth shaped structure.

Figure 18:
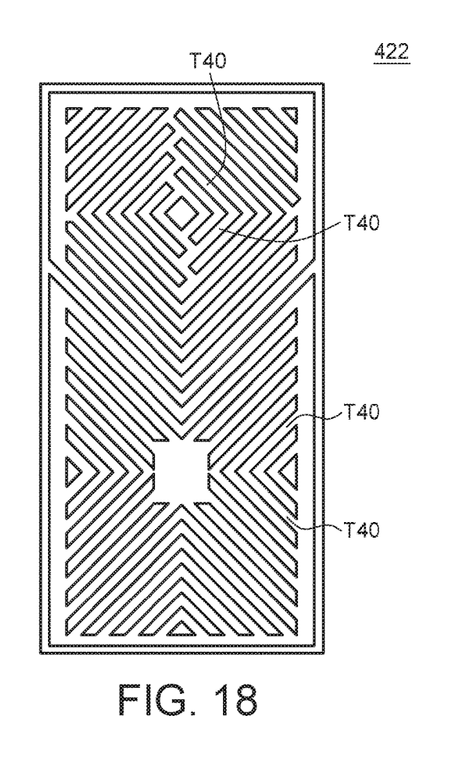
FIG. 18 shows a second electrode layer in one pixel according to another embodiment.

Please refer to FIG. 18, which shows a second electrode layer 422 in one pixel according to another embodiment. In this embodiment, the number of the trunk electrodes is reduced. One of the branch electrodes T40 is connected to and perpendicular to another one of the branch electrodes T40 to form a V shaped structure.

Figure 19:
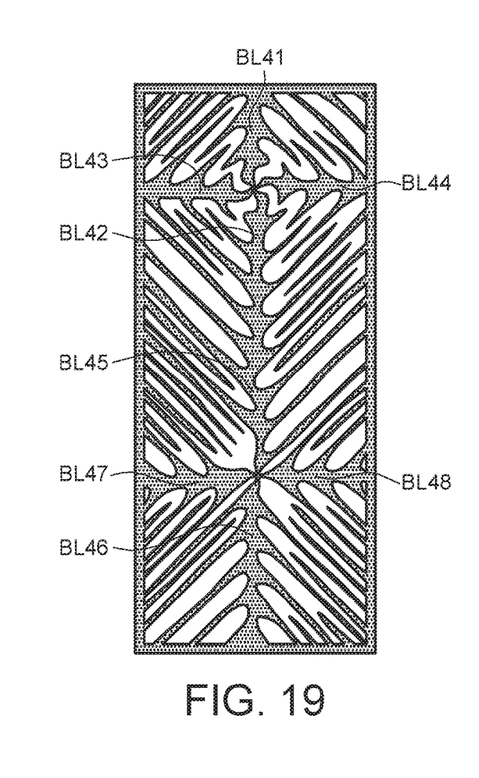
FIG. 19 shows a plurality of bright stripes and a plurality of dark stripes formed by the second electrode layer of FIG. 18 in one pixel.

Please refer to FIGS. 18 and 19. FIG. 19 shows a plurality of bright stripes and a plurality of dark stripes formed by the second electrode layer 422 design of FIG. 18 in one pixel. Because the number of the trunk electrodes is reduced, the connection between two of the branch electrodes T40 is right angle, and a 45/135 electric filed is formed. As such, the dark stripe (not shown) formed by the connection of the branch electrodes T40 can be reduced and can be accurately overlapped with the dark stripes BL41 to BL48 formed by the optical alignment. According to some experiments, the aperture ratio of the pixel can be increased 13.4%.

Figure 20:
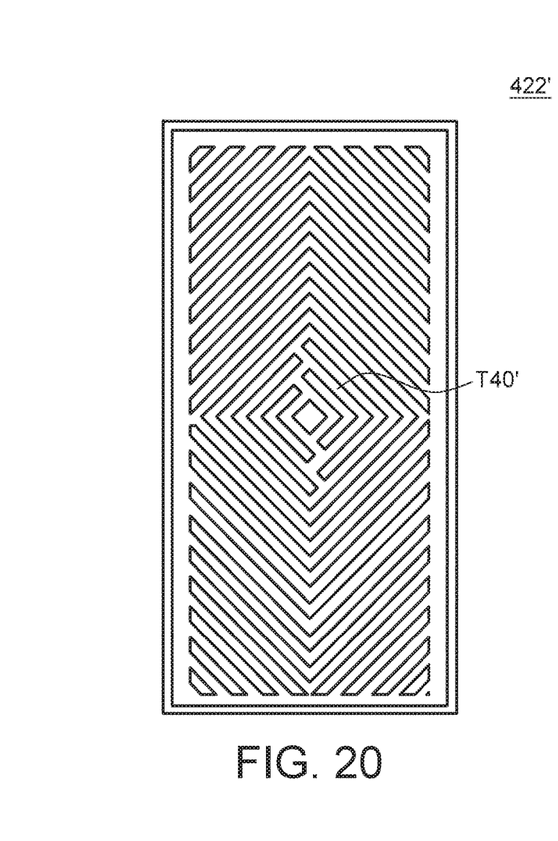
FIG. 20 shows a second electrode layer in one pixel according to another embodiment.

Please refer to FIG. 20, which shows a second electrode layer 422' in one pixel according to another embodiment. In this embodiment, the branch electrodes T40' of the second electrode layer 422' are arranged in a diamond shaped structure. The number of the trunk electrodes is reduced. One of the branch electrodes T40' is connected to and perpendicular to another two of the branch electrodes T40' to form a V shaped structure.

Figure 21:
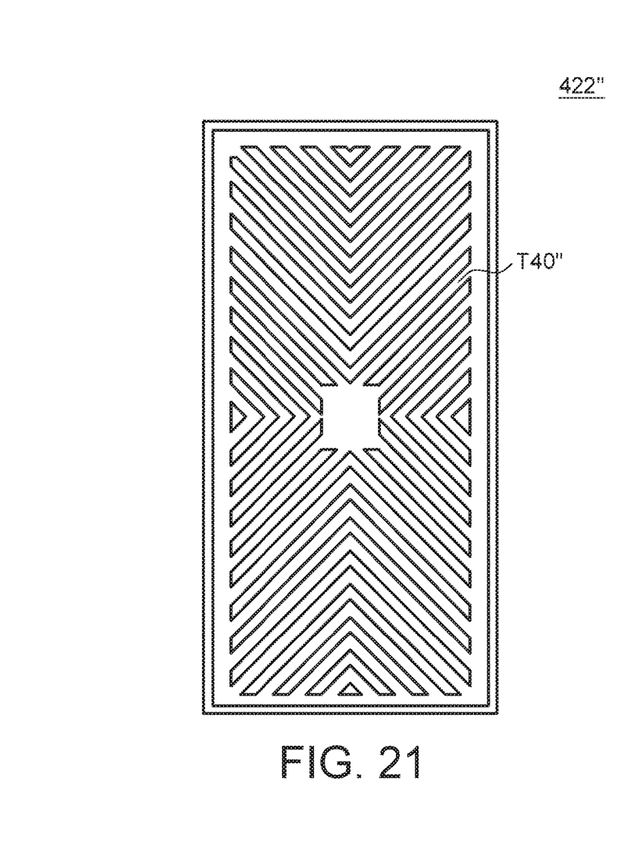
FIG. 21 shows a second electrode layer in one pixel according to another embodiment.

Please refer to FIG. 21, which shows a second electrode layer 422" in one pixel according to another embodiment. In this embodiment, the branch electrodes T40" of the second electrode layer 422" are arranged in an X shaped structure. The number of the trunk electrode is reduced. One of the branch electrodes T40" is connected to and perpendicular to another two of the branch electrodes T40" to form a V shaped structure.

The aperture ratio of the pixel is improved by the designs in those embodiments. In other embodiments, the designs of those embodiments can be combined to improve the aperture ratio of the pixel.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, having a plurality of pixels, wherein one of the pixels comprises:
a first substrate, including:
a first electrode layer; and
a first alignment layer, covering the first electrode layer;
a second substrate, including:
a second electrode layer, having a first electrode pattern and a second electrode pattern, wherein the first electrode pattern and the second electrode pattern are separated, the first electrode pattern has a convex edge, the second electrode pattern has a concave edge, the shape of the convex edge is complementary to the shape of the concave edge, the first electrode pattern has a first region, a second region, a third region and a fourth region which are arranged in four quadrants sequentially, the second pattern has a fifth region, a sixth region, a seventh region and an eighth region which are arranged according to four quadrants in sequence, the third region is adjacent to the sixth region, the fourth region is adjacent to the fifth region, the second electrode layer further has a plurality of branch electrodes separately disposed in the first region to the eighth region, the branch electrodes disposed in the third region and the sixth region are arranged along the same direction, the branch electrodes disposed in the fourth region and the fifth region are arranged along the same direction, and the branch electrodes disposed in the third region and the fourth region are arranged along different directions, wherein the branch electrodes disposed in the first region, the second region, the third region and the fourth region are arranged as a concentric diamond shaped structure; and
a second alignment layer, covering the second electrode layer; and
a liquid crystal layer, disposed between the first substrate and the second substrate.

2. The LCD panel according to claim 1, wherein the convex edges and the concave edges have the V shape.

3. The LCD panel according to claim 2, wherein the first electrode pattern further has a first trunk electrode, a second trunk electrode, a third trunk electrode and a fourth trunk electrode, which define the first region to the fourth region, the first trunk electrode and the second trunk electrode are extended along a direction parallel to a first straight line, and a central axis of the first trunk electrode and a central axis of the second trunk electrode are located at two opposite sides of the first straight line respectively.

4. The LCD panel according to claim 3, wherein the third trunk electrode and the fourth trunk electrode are extended along a direction parallel to a second straight line, a central axis of the third trunk electrode and a central axis of the fourth trunk electrode are located at two opposite sides of the second straight line respectively, and the first straight line and the second straight line are crossed.

5. The LCD panel according to claim 2, wherein a distance between one of the convex edges and one of the concave edges adjacent to the one of the convex edges is 2 to 5 μm.

6. The LCD panel according to claim 2, wherein the branch electrodes disposed in the first region, the third region, the sixth region and the eighth region are arranged along a first direction; and the branch electrodes disposed in the second region, the fourth region, the fifth region and the seventh region are arranged along a second direction different from the first direction.

7. The LCD panel according to claim 6, wherein one of the branch electrodes is connected to and perpendicular to another two of the branch electrodes to form a saw tooth shaped structure at connecting region.

8. The LCD panel according to claim 6, wherein one of the branch electrodes is connected to and perpendicular to another one of the branch electrodes to form a V shaped structure at connecting region.

* * * * *